US012627893B2

(12) United States Patent
Ryu et al.

(10) Patent No.: US 12,627,893 B2
(45) Date of Patent: May 12, 2026

(54) DEVICE AND METHOD FOR PRODUCING PANORAMIC IMAGE

(71) Applicant: VISIT INC., Wonju-si (KR)

(72) Inventors: Geun Woong Ryu, Seoul (KR); Yong Won Cho, Seoul (KR)

(73) Assignee: VISIT INC., Wonju-si (KR)

( * ) Notice: Subject to any disclaimer, the term of this patent is extended or adjusted under 35 U.S.C. 154(b) by 89 days.

(21) Appl. No.: 18/841,025

(22) PCT Filed: Feb. 3, 2023

(86) PCT No.: PCT/KR2023/001551
§ 371 (c)(1),
(2) Date: Aug. 23, 2024

(87) PCT Pub. No.: WO2023/163412
PCT Pub. Date: Aug. 31, 2023

(65) Prior Publication Data
US 2025/0168512 A1 May 22, 2025

(30) Foreign Application Priority Data
Feb. 25, 2022 (KR) ........................ 10-2022-0025212

(51) Int. Cl.
*H04N 23/698* (2023.01)
*G06T 3/4038* (2024.01)
*G06T 7/70* (2017.01)

(52) U.S. Cl.
CPC ......... *H04N 23/698* (2023.01); *G06T 3/4038* (2013.01); *G06T 7/70* (2017.01); *G06T 2207/30244* (2013.01)

(58) Field of Classification Search
CPC ............................. H04N 23/698; G06T 3/4038
See application file for complete search history.

(56) References Cited

U.S. PATENT DOCUMENTS

2012/0026283 A1* 2/2012 Kim ...................... H04N 23/951
348/E7.013
2014/0267593 A1* 9/2014 Kim ...................... H04N 23/698
348/36
(Continued)

FOREIGN PATENT DOCUMENTS

JP        2013020528 A     1/2013
KR    1020140011964 A     1/2014
(Continued)

OTHER PUBLICATIONS

International Search Report of PCT/KR2023/001551 dated Apr. 12, 2023.

*Primary Examiner* — Jayanti K Patel
*Assistant Examiner* — Christopher Kingsbury Glover
(74) *Attorney, Agent, or Firm* — Dinsmore & Shohl LLP; Yongsok Choi, Esq.

(57) ABSTRACT

A panoramic image generation device includes a photographing unit for receiving an input of multiple photographic images; a photographing information generation unit for generating photographing information of the photographic image on the basis of photographing posture information including information on a camera posture at which the photographic image is obtained; an image conversion unit for generating an output image obtained by converting the photographic image into a low-resolution image; an output unit for disposing the output image; an image stitching unit for sequentially performing stitching for the multiple photographic images corresponding to the output image disposed in the three-dimensional spatial area; a first memory unit provided to load the output image output from the output unit and the photographic image; and a second memory unit for storing the photographic image and
(Continued)

P the output image obtained through the conversion of the photographic image.

16 Claims, 4 Drawing Sheets

(56)                    References Cited

U.S. PATENT DOCUMENTS

| 2016/0063705 | A1* | 3/2016 | Xu | ....................... H04N 5/2624 |
| | | | | 382/199 |
| 2022/0237736 | A1* | 7/2022 | Wang | ...................... G06T 3/047 |
| 2024/0064265 | A1* | 2/2024 | Wang | ..................... H04N 7/181 |

FOREIGN PATENT DOCUMENTS

| KR | 1020140112909 | A | 9/2014 |
| KR | 101903285 | B1 | 10/2018 |
| KR | 101936168 | B1 | 4/2019 |

* cited by examiner

[FIG. 1]
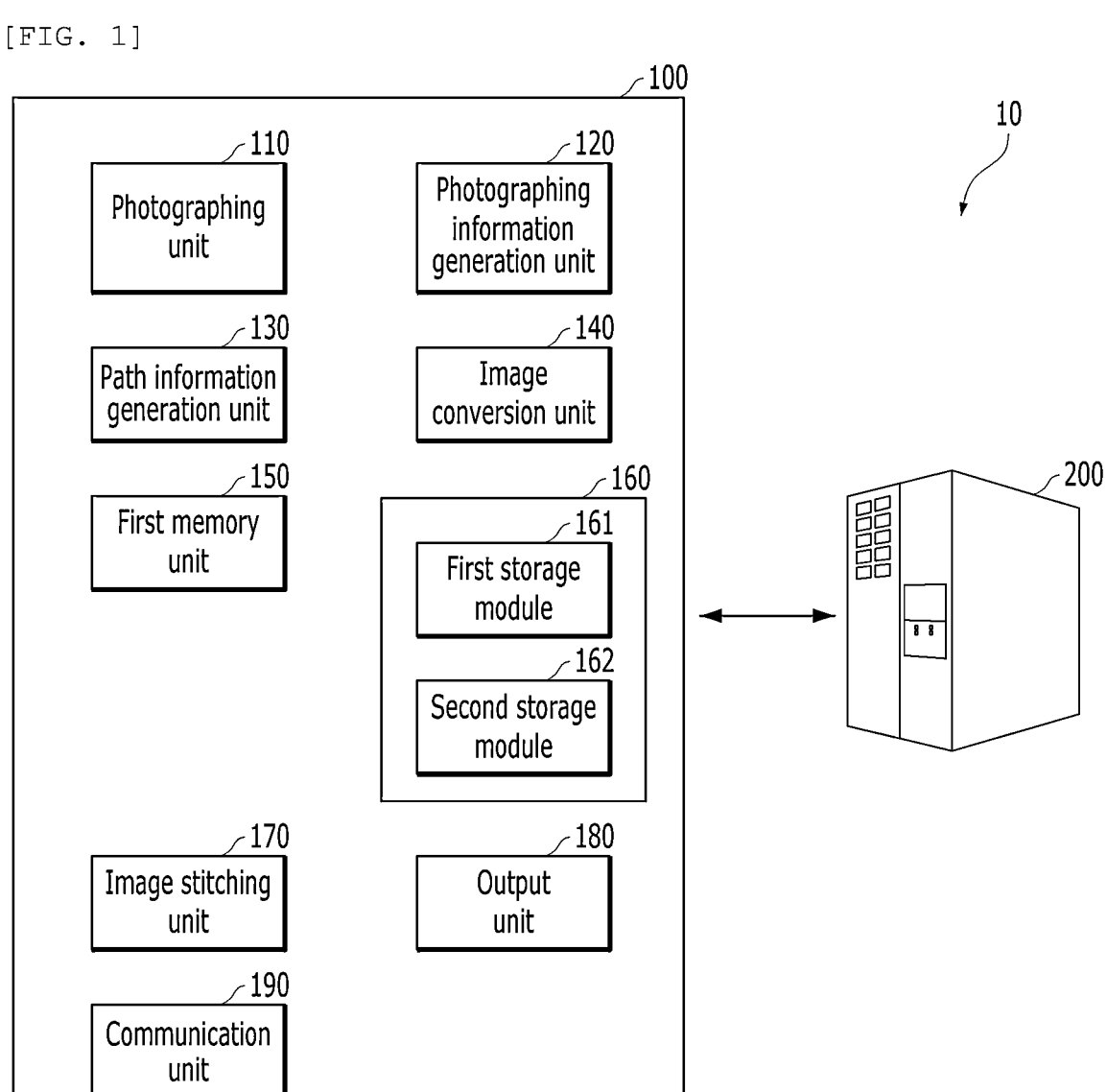

[FIG. 2]
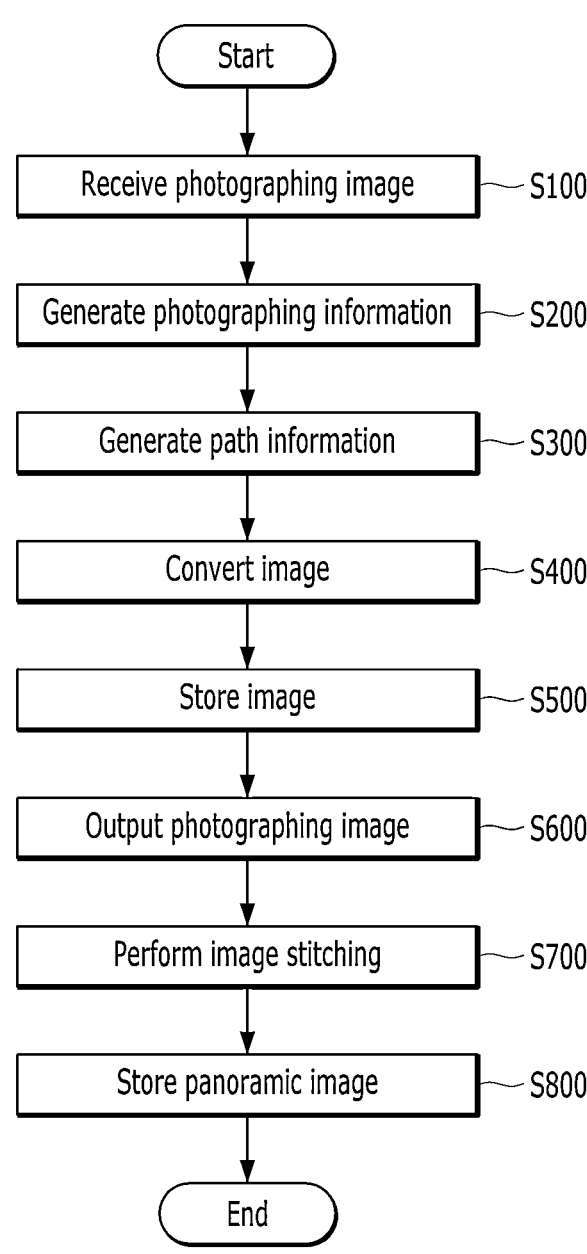

[FIG. 3]
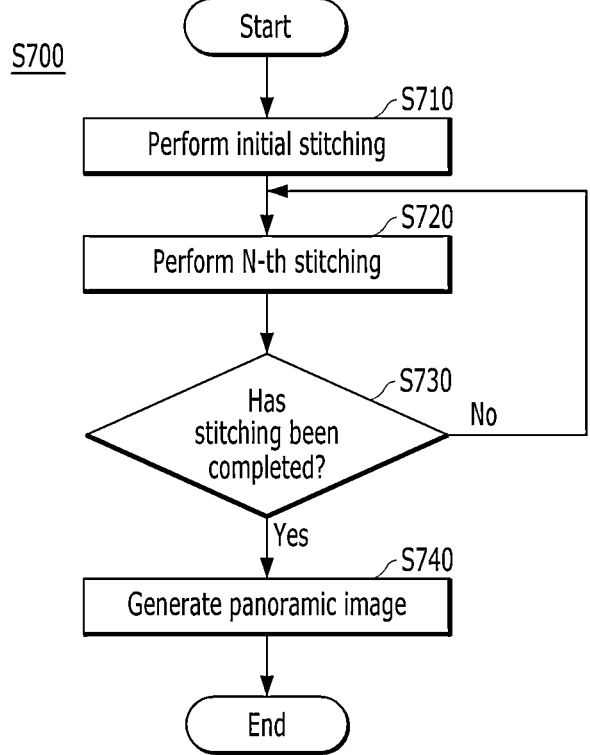
[FIG. 4]
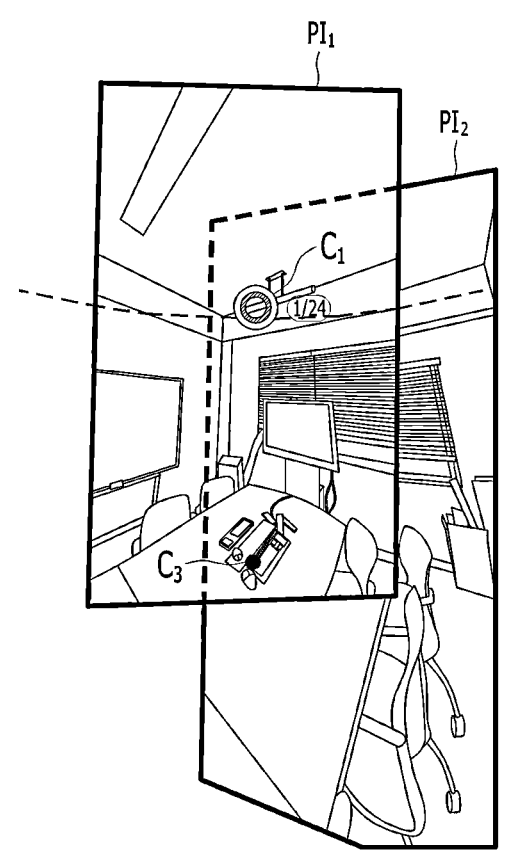

[FIG. 5]
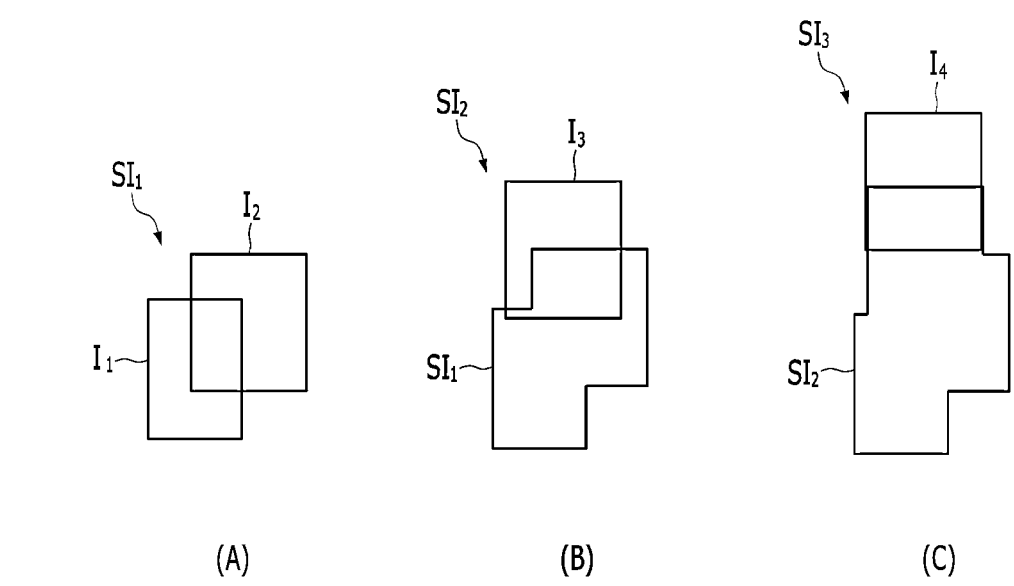
(A)          (B)          (C)
[FIG. 6]
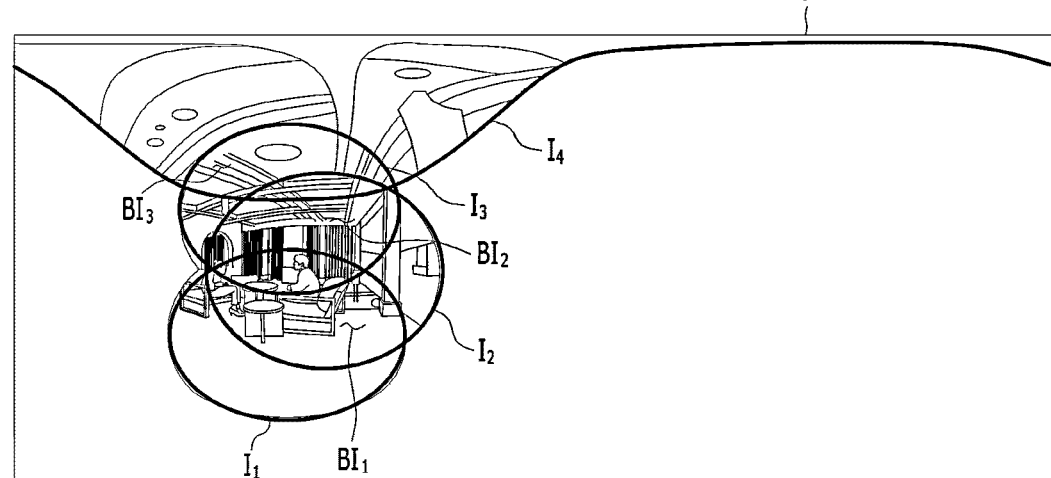

DEVICE AND METHOD FOR PRODUCING PANORAMIC IMAGE

CROSS-REFERENCE TO RELATED APPLICATIONS

This application is a national phase of International Application No. PCT/KR2023/001551 filed on Feb. 3, 2023, which claims priority to Korean Patent Application No. 10-2022-0025212 filed on Feb. 25, 2022, the entire contents of which are herein incorporated by reference.

TECHNICAL FIELD

The present disclosure relates to a panoramic image generation apparatus and method, and to a panoramic image generation apparatus and method which generate a panoramic image based on a plurality of photographing images.

BACKGROUND ART

In order to implement a 360-degree image, a panoramic image may be generated based on an image stitched by using a large number of photographing images. A 360-degree image stitched by mapping the panoramic image to a surface of a sphere may be output to a user.

In this case, in order to smoothly provide the user with the panoramic image constructed by stitching the plurality of photographing images, sufficient memory availability of a device from which the panoramic image is output needs to be secured.

In a conventional technology, in order to consider the solving means, memory management is dynamically performed by loading only an image that is output to a user, unloading an image that is not output, and leaving only a memory reference.

DISCLOSURE

Technical Problem

Embodiments of the present disclosure are intended to provide a panoramic image generation apparatus and method which provide a user with a panoramic image that is generated based on a plurality of photographing images for which memory has been optimized.

Technical Solution

A panoramic image generation apparatus for generating a panoramic image based on a plurality of images according to an aspect of an embodiment of the present disclosure includes a photographing unit configured to receive a plurality of photographing image that has been photographed, a photographing information generation unit configured to generate photographing information of the photographing images based on photographing posture information including photographed camera posture information of the photographing images, an image conversion unit configured to generate output images that are obtained by converting the photographing images into low resolution images, an output unit configured to output the output images converted from the photographing images by disposing the output images in a three-dimensional space region based on the photographing information of the photographing images, an image stitching unit configured to generate a panoramic image by sequentially performing stitching on the plurality of photographing images corresponding to the output images disposed in the three-dimensional space region, a first memory unit provided so that the output images output to the output unit and the photographing images for the execution of the image stitching by the image stitching unit are loaded thereon, and a second memory unit configured to store the photographing images and the output images converted from the photographing images.

Furthermore, the output unit may output the output image disposed in the three-dimensional space region by loading the output image stored in the second memory unit onto the first memory unit. The image stitching unit may generate the panoramic image by removing the output images loaded onto the first memory unit from the first memory unit, loading the photographing images corresponding to the output images onto the first memory unit, and performing the stitching between the photographing images loaded onto the first memory unit.

Furthermore, the image stitching unit may perform initial stitching that generates a first stitching image by performing stitching between arbitrary photographing images that neighbor each other, may perform N-th stitching that generates an N-th stitching image by performing stitching between an (N−1)-th (N is an integer equal to or greater than 2) stitching image and a photographing image that neighbors the (N−1)-th stitching image, and may generate the panoramic image based on the N-th stitching image by repeating the N-th stitching.

Furthermore, the image stitching unit may generate the N-th stitching image by loading the generated (N−1)-th stitching image and the photographing image that neighbors the (N−1)-th stitching image from the second memory unit to the first memory unit and performing the stitching between the (N−1)-th stitching image and the photographing image that neighbors the (N−1)-th stitching image through a single process.

Furthermore, when performing the N-th stitching, the image stitching unit may remove the generated (N−1)-th stitching image and the photographing image that neighbors the (N−1)-th stitching image on which the stitching has been completed, from the first memory unit.

Furthermore, the photographing information generation unit may generate the photographing information based on the photographing posture information including photographed orientation information of the photographing image. The image stitching unit may perform the stitching between the photographing images so that a photographing image having the orientation information adjacent to preset orientation information that is a reference by which the photographing images included in the panoramic image are preferentially output is disposed at the center of the panoramic image.

Furthermore, the panoramic image generation apparatus may further include a path information generation unit configured to generate stitching path information that is arrangement information of the photographing images corresponding to the output images disposed in the three-dimensional space region. The photographing information generation unit may generate the photographing information in the form of a file name of the photographing image. The path information generation unit may generate the stitching path information based on the file name of the photographing image. The image stitching unit may perform the stitching between the photographing images by disposing the photographing images in the three-dimensional space region based on the stitching path information.

Furthermore, the photographing unit may receive the plurality of photographing images photographed based on nodes that are disposed at preset intervals in the three-dimensional space region.

Furthermore, the image stitching unit may perform the stitching by blending overlap regions that are regions that overlap between the photographing images disposed in the three-dimensional space region, and may perform the blending between the photographing images by measuring a plane distance between the photographing images of the overlap region, which is measured by performing raycasting from an origin point of the three-dimensional space region, and adjusting a gradient of the overlap region of the photographing images based on the measured plane distance.

A panoramic image generation method using a panoramic image generation apparatus according to another aspect of an embodiment of the present disclosure includes a photographing image input step of receiving a plurality of photographing image that has been photographed, a photographing information generation step of generating photographing information of the photographing images based on photographing posture information including photographed camera posture information of the photographing images, an image conversion step of generating output images that are obtained by converting the photographing images into low resolution images, an image storage step of storing the photographing images and the output images converted from the photographing images in a second memory unit, a photographing image output step of outputting the output images converted from the photographing images by disposing the output images in a three-dimensional space region based on the photographing information of the photographing images, and an image stitching execution step of generating a panoramic image by sequentially performing stitching on the plurality of photographing images corresponding to the output images disposed in the three-dimensional space region. The photographing image output step includes outputting the output images disposed in the three-dimensional space region by loading the output images stored in the second memory unit onto a first memory unit. The image stitching execution step includes loading the photographing images onto the first memory unit for the image stitching and performing the stitching between the photographing images loaded onto the first memory unit.

Furthermore, in the image stitching execution step, the panoramic image may be generated by removing the output images loaded onto the first memory unit from the first memory unit, loading the photographing images corresponding to the output images onto the first memory unit, and performing the stitching between the photographing images loaded onto the first memory unit.

Furthermore, the image stitching execution step may include an initial stitching execution step of generating a first stitching image by performing stitching between arbitrary photographing images that neighbor each other, and an N-th stitching execution step of generating an N-th stitching image by performing stitching between an (N−1)-th (N is an integer equal to or greater than 2) stitching image and a photographing image that neighbors the (N−1)-th stitching image, wherein the panoramic image is generated based on the N-th stitching image by repeatedly performing the N-th stitching execution step.

Furthermore, in the N-th stitching execution step, the N-th stitching image may be generated by loading the generated (N−1)-th stitching image and the photographing image that neighbors the (N−1)-th stitching image from the second memory unit to the first memory unit and performing the stitching between the (N−1)-th stitching image and the photographing image that neighbors the (N−1)-th stitching image through a single process.

Furthermore, in the N-th stitching execution step, the generated (N−1)-th stitching image and the photographing image that neighbors the (N−1)-th stitching image on which the stitching has been completed may be removed from the first memory unit.

Furthermore, in the photographing information generation step, the photographing information may be generated based on the photographing posture information including photographed orientation information of the photographing image. In the image stitching execution step, the stitching between the photographing images may be performed so that a photographing image having the orientation information adjacent to preset orientation information that is a reference by which the photographing images included in the panoramic image are preferentially output is disposed at the center of the panoramic image.

Furthermore, the panoramic image generation method may further include a path information generation step of generating stitching path information that is arrangement information of the photographing images corresponding to the output images disposed in the three-dimensional space region. In the photographing information generation step, the photographing information may be generated in the form of a file name of the photographing image. In the path information generation step, the stitching path information may be generated based on the file name of the photographing image. In the image stitching execution step, the stitching between the photographing images may be performed by disposing the photographing images in the three-dimensional space region based on the stitching path information.

Furthermore, in the photographing image input step, the plurality of photographing images photographed based on nodes that are disposed at preset intervals in the three-dimensional space region may be received.

Furthermore, in the image stitching execution step, the stitching may be performed by blending overlap regions that are regions that overlap between the photographing images disposed in the three-dimensional space region. The blending between the photographing images may be performed by measuring a plane distance between the photographing images of the overlap region, which is measured by performing raycasting from an origin point of the three-dimensional space region, and adjusting a gradient of the overlap region of the photographing images based on the measured plane distance.

Advantageous Effects

According to the proposed embodiment, the panoramic image generation apparatus and method of the present disclosure can optimize a memory load while occurs in a process of stitching a plurality of photographing images, for generating a panoramic image, because a panoramic image can be generated based on the plurality of photographing images.

DESCRIPTION OF DRAWINGS

FIG. 1 is a diagram schematically illustrating a construction of a panoramic image generation apparatus and a management server according to an embodiment of the present disclosure.

FIG. 2 is a flowchart illustrating a panoramic image generation method that is performed by the panoramic image generation apparatus of FIG. 1.

FIG. 3 is a flowchart illustrating an image stitching step of the panoramic image generation method of FIG. 2 in detail.

FIG. 4 is an exemplary diagram illustrating that output images are disposed in a three-dimensional space region and output by the panoramic image generation apparatus of FIG. 1.

FIG. 5 is an exemplary diagram illustrating that photographing images are sequentially stitched by the image stitching step of the panoramic image generation method of FIG. 2.

FIG. 6 is an exemplary diagram illustrating a panoramic image that is generated based on a plurality of photographing images by the panoramic image generation apparatus of FIG. 1.

BEST MODE

Advantages and characteristics of the present disclosure and a method for achieving the advantages and characteristics will become apparent from embodiments described in detail later in conjunction with the accompanying drawings. However, the present disclosure is not limited to the disclosed embodiments, but may be implemented in various different forms. The embodiments are merely provided to complete the present disclosure and to fully notify a person having ordinary knowledge in the art to which the present disclosure pertains of the category of the present disclosure. The present disclosure is merely defined by the category of the claims.

A first, a second, etc. are used to describe various components, but the components are not restricted by the terms. The terms are used to only distinguish one component from the other components. Accordingly, a first component that is described hereinafter may be a second component within the technical spirit of the present disclosure.

Throughout the specification, the same reference numeral denotes the same component.

Characteristics of several embodiments of the present disclosure may be partially or entirely coupled or combined and may be technically variously associated and driven as may be sufficiently understood by those skilled in the art. The embodiments may be independently implemented and may be implemented in an associative relation.

Meanwhile, a potential effect that has not been specifically mentioned in the specification of the present disclosure and that may be expected by technical characteristics of the present disclosure is treated as if it has been described in this specification. The present embodiment has been provided to a person having ordinary knowledge in the art to more fully describe the present disclosure. Contents illustrated in the drawings may be exaggerated and represented compared to an implementation form of an actual invention. A detailed description of a component will be omitted or described in brief if it is deemed to make the subject matter of the present disclosure unnecessarily vague.

Hereinafter, embodiments of the present disclosure are described in detail with reference to the accompanying drawings.

FIG. 1 is a diagram schematically illustrating a construction of a panoramic image generation apparatus and a management server according to an embodiment of the present disclosure.

Referring to FIG. 1, a panoramic image generation system 10 may include a panoramic image generation apparatus 100 and a management server 200.

First, the panoramic image generation apparatus 100 may include a photographing unit 110, a photographing information generation unit 120, a path information generation unit 130, an image conversion unit 140, a first memory unit 150, a second memory unit 160, an image stitching unit 170, an output unit 180, and a communication unit 190.

The panoramic image generation apparatus 100 may be any one of a desktop, a tablet PC, smart TV, a mobile phone, and a personal digital assistant (PDA), but is not limited thereto and may be a device in which an application capable of receiving or processing a photographing image has been installed.

First, the photographing unit 110 included in the panoramic image generation apparatus 100 may receive a plurality of photographing images I that have been photographed.

The photographing unit 110 may receive the photographing images I that have been photographed at the same photographing location in order to generate a panoramic image P in which the plurality of photographing images I has been stitched.

Illustratively, the photographing unit 110 may be a photographing module capable of generating the photographing images I or a reception module that is connected to an external photographing module and can receive the photographing images I.

Furthermore, the photographing unit 110 may receive the plurality of photographing images I photographed based on nodes C that are disposed at preset intervals in a three-dimensional space region.

In this case, the nodes C are photographing guide points that are disposed at preset intervals in the three-dimensional space region in order to generate the panoramic image P. A user can reduce the generation of many overlap regions between the photographing images I and constitute the panoramic image P, that is, a 360-degree photographing image, based on a small number of photographing images by minimizing a blank region between the photographing images I, by checking the nodes C that are disposed and displayed in the three-dimensional space region through the output unit 180 of the panoramic image generation apparatus 100 and photographing the photographing images I by matching the nodes C and the focus of a camera.

In this case, the panoramic image P may be an equirectangular panoramic image, but is not limited thereto and may be at least one panoramic image type that constitutes a 360-degree image, such as a cube map, a cylindrical shape, or a pyramid form.

The photographing information generation unit 120 generates photographing information $(I_C)$ of the photographing image I, based on photographing posture information $(I_{CP})$ including the photographed camera posture information of the photographing image I.

In this case, the photographing information generation unit 120 may generate the photographing information $(I_C)$ of the photographing image I, based on the photographing posture information $(I_{CP})$ including yaw, pitch, and roll values, that is, the photographed camera posture information of the photographing images I.

In this case, the generated photographing information $(I_C)$ may be stored in the second memory unit 160 to be described later in the form of a file name based on the photographing posture information $(I_{CP})$ of the photographing image I. The photographing information generation unit

120 may generate the photographing information (I$_C$) in the form of the file name of the photographing image I. In this case, the photographing information (I$_C$) that is generated in the form of the file name may be generated based on arbitrary numbers and the photographing posture informa-tion (I$_{CP}$).

Illustratively, the file name may be generated like "temp002358_r0.03212_p0.15821_y1.7745.jpg" including an arbitrary numbers and the photographing posture infor-mation (I$_{CP}$).

Furthermore, the photographing information generation unit 120 may generate the photographing information (I$_C$), based on the photographing posture information (I$_{CP}$) including photographed orientation information (I$_{CD}$) of the photographing image I.

In this case, the orientation information (I$_{CD}$) is informa-tion on the direction of the photographing image I, and may be information that is measured by a magnetometer sensor.

The orientation information (I$_{CD}$) may be stored in the form of metadata of the photographing image I or may be stored in the second memory unit 160, that is, a repository, in a separate form of data.

The photographing information generation unit 120 gen-erates the photographing information (I$_C$) including the orientation information (I$_{CD}$) and the camera posture infor-mation. Accordingly, the arrangement of the photographing images I in the three-dimensional space region for the stitching of the panoramic image and the arrangement of output images PI that are output to a user, in the image stitching unit 170 and the output unit 180 to be described later, can be properly performed based on the photographing information (I$_C$).

In this case, the panoramic image generation apparatus 100 includes the path information generation unit 130, and may generate stitching path information R, that is, arrange-ment information of the photographing images I correspond-ing to the output images PI disposed in the three-dimen-sional space region.

In this case, the path information generation unit 130 may generate the stitching path information R based on the photographing image I including the photographing infor-mation (I$_C$). Specifically, the path information generation unit 130 may generate the stitching path information R based on the file name of the photographing image I.

The stitching path information R is information on a path that is related to a file location where the plurality of photographing images I has been stored in the second memory unit 160. In order to perform stitching on the photographing images I photographed at the same location, the image stitching unit 170 to be described later may load the photographing images I, that is, a stitching target, onto the first memory unit 150 by reading the stitching path information R, may automatically arrange the loaded pho-tographing images I in the three-dimensional space region, and may perform the stitching between the photographing images I.

The image conversion unit 140 generates the output image PI that is obtained by converting the photographing image I into a low resolution image.

Illustratively, the image conversion unit 140 may generate the output image PI by converting the photographing image into a low resolution image having low pixels by performing down-sampling having a bitmap format.

The image conversion unit 140 converts the photograph-ing image I into the output image PI, that is, a low resolution image. The converted output image PI may be disposed in the three-dimensional space region and output through the output unit 180.

The first memory unit 150 may be provided so that the output image PI that is output to the output unit 180 and the photographing image I for image stitching to be performed by the image stitching unit 170 are loaded therefrom.

The first memory unit 150 may load the photographing image I and the output image PI from the second memory unit 160 in which data that are executed and processed by a central processing unit (CPU), that is, the photographing image I and the output image PI, have been stored, may access the address of each of the loaded data, and may execute the data.

Illustratively, the first memory unit 150 may be random access memory (RAM) capable of being read and written through access to an arbitrary region therein.

Specifically, the first memory unit 150 may load the output image PI, that is, a low resolution image of the photographing image I. The output unit 180 may provide a user with the output image PI by disposing the loaded output image PI in the three-dimensional space region and output-ting the output image.

Furthermore, when the image stitching unit 170 performs stitching between the photographing images I, the output unit 180 may remove the output images PI loaded onto the first memory unit 150 from the first memory unit 150, and the photographing images I, that is, stitched targets, may be loaded onto the first memory unit 150. Accordingly, the image stitching unit 170 may perform the stitching between the photographing images I loaded onto the first memory unit 150.

As the photographing image I and the output image PI are loaded onto or removed from the first memory unit 150 in response to operations of the image stitching unit 170 and the output unit 180, the overload of the first memory unit 150 can be prevented because a load of the first memory unit 150, which occurs as the photographing image and the output image are loaded onto the first memory unit, is properly controlled.

The second memory unit 160 may store the photograph-ing image I and the output image PI converted from the photographing image.

The second memory unit 160 stores various data based on the processing and control of a component that performs each piece of control. As the second memory unit 160 is accessed by a component that performs each piece of control, read, write, edit, delete, update, etc. may be per-formed on the photographing image I and the output image PI stored in the second memory unit 160.

Specifically, the second memory unit 160 may include a first storage module 151 in which the photographing images I and the output images PI are temporarily stored and a second storage module 152 in which the panoramic image generated based on the photographing images I is stored.

The first storage module 151 is a temporary repository in which temporary data for performing a program are stored. The first storage module temporarily stores data, such as the photographing image I and the output image PI, that is, processing targets for output and stitching. The data are loaded onto the first memory unit 150 by each control component, so that the processing speed of data can be improved. Illustratively, the first storage module 151 may be a cache repository, and may be a storage space that has been allocated for temporary storage, such as a hard disc drive (HDD) or a solid state drive (SSD) in which cache data are stored.

The second storage module 152 may store the panoramic image that is generated based on the plurality of photographing images I. In this case, the second storage module 152 is nonvolatile memory, and may be implemented with a repository in which a large amount of image data can be stored, such as flash memory, an HDD, an SSD, or an optical disc drive (ODD) such as a DVD player or a Blueray disk player.

The image stitching unit 170 generates the panoramic image P by sequentially performing stitching on the plurality of photographing images I corresponding to the output images PI that are disposed in the three-dimensional space region.

In this case, the image stitching unit 170 may generate the panoramic image P by removing, from the first memory unit 150, the output images PI loaded onto the first memory unit 150, loading the photographing images I corresponding to the output images PI onto the first memory unit 150, and performing stitching between the photographing images I loaded onto the first memory unit 150.

Specifically, the image stitching unit 170 may perform initial stitching that generates a first stitching image by performing stitching between arbitrary photographing images I that neighbor each other, may perform N-th stitching that generates an N-th stitching image ($SI_N$) by performing stitching between an (N−1)-th (N is an integer equal to or greater than 2) stitching image and a photographing image that neighbors the (N−1)-th stitching image, and may generate the panoramic image P based on the N-th stitching image ($SI_N$) by repeating the N-th stitching.

In this case, the image stitching unit 170 may generate the N-th stitching image ($SI_N$) through a single process of loading the generated (N−1)-th stitching image ($SI_{N-1}$) and the photographing image that neighbors the (N−1)-th stitching image from the second memory unit 160 to the first memory unit 150 and performing stitching between the (N−1)-th stitching image ($SI_{N-1}$) and the photographing image that neighbors the (N−1)-th stitching image.

When performing the N-th stitching, the image stitching unit 170 may remove, from the first memory unit 150, the generated (N−1)-th stitching image ($SI_{N-1}$) and the photographing image that neighbors the (N−1)-th stitching image on which the stitching has been completed.

Illustratively, when performing stitching on twenty-four photographing images I photographed at any one photographing location, the image stitching unit 170 may generate a first stitching image ($SI_1$) by performing stitching between a first photographing image ($I_1$), that is, any one of the twenty-four photographing images I, and a second photographing image ($I_2$), that is, a photographing image that neighbors the first photographing image ($I_1$). The image stitching unit 170 may generate a second stitching image ($SI_2$) by performing stitching between the first stitching image ($SI_1$) and a third photographing image ($I_3$), that is, a photographing image that neighbors the first stitching image.

In this case, the image stitching unit 170 may generate a third stitching image ($SI_3$), by removing the generated first stitching image ($SI_1$) and the third photographing image ($I_3$) from the first memory unit 150 by performing stitching except the generated second stitching image ($SI_2$), loading a fourth photographing image ($I_4$) onto the first memory unit 150, and performing stitching between the second stitching image ($SI_2$) and the fourth photographing image ($I_4$). The image stitching unit may generate the panoramic image P based on a final stitching image on which all types of stitching between the photographing images have been completed, by repeating such a stitching process and an operation of loading/removing a target to be stitched.

Furthermore, as the image stitching unit 170 performs stitching between the photographing images I or the photographing image I and the stitching image (SI) through a single process, the overload of memory, which may occur due to a plurality of stitching tasks or a parallel process between a stitching task and an external task in a conventional technology, can be prevented.

Furthermore, the image stitching unit 170 may perform stitching between the photographing images I so that a photographing image I having orientation information ($I_{CD}$) adjacent to preset orientation information, that is, a reference by which the photographing images I included in the panoramic image P are preferentially output, is disposed at the center of the panoramic image P.

The image stitching unit 170 may generate the panoramic image P in which the orientation information ($I_{CD}$) has been considered, by disposing the photographing image I having the orientation information ($I_{CD}$) adjacent to the preset orientation information, among photographing images, at the center of the panoramic image P and performing stitching between the photographing images I.

Illustratively, when the preset orientation information is "North" and two panoramic images are to be generated, all photographing images I photographed in the "North" disposed at the centers of a first panoramic image ($P_1$) and a second panoramic image ($P_2$) that are generated through the image stitching unit 170. Accordingly, a user can be provided with an omnidirectional image that is generated based on the panoramic image P in a direction in which the user can consistently perceive the omnidirectional image.

The present disclosure is not limited thereto. The image stitching unit 170 may generate a panoramic image having the same camera direction by disposing the photographing images I based on preset orientation information and orientation information ($I_{CD}$) of the photographing images I.

Furthermore, the image stitching unit 170 may dispose the photographing images in the three-dimensional space region based on the stitching path information R, and may perform stitching between the photographing images.

As the image stitching unit 170 disposes the photographing images in the three-dimensional space region based on the stitching path information R, stitching between the photographing images I can be rapidly performed because a path to the file locations of the plurality of photographing images I, that is, stitching targets, and information on the plurality of photographing images disposed in the three-dimensional space region can be checked.

In this case, the image stitching unit 170 may perform stitching between the photographing images I by blending an overlap region, that is, a region that overlaps between the photographing images I disposed in the three-dimensional space region, but may perform blending between the photographing images I by measuring a plane distance between the photographing images I of the overlap region, which is measured by performing raycasting from an origin point of the three-dimensional space region, and adjusting the gradient of the overlap region of the photographing images I based on the measured plane distance.

As the image stitching unit 170 measures the plane distance in the three-dimensional space region and performs blending by adjusting the gradient of the overlap region, natural stitching can be performed between the photographing images I.

The output unit 180 may output the output image I converted from the photographing image I by disposing the output image PI in the three-dimensional space region based on the photographing information ($I_C$) of the photographing image I.

Illustratively, the output unit may provide a user with the output image PI, that is, a low resolution image of the photographing image I, by disposing the output image PI at a location corresponding to coordinate values of the three-dimensional space region based on yaw, pitch, and roll values, that is, the photographing posture information ($I_{CP}$) included in the photographing information ($I_C$).

The output unit 180 may load the output image PI stored in the second memory unit 160 onto the first memory unit 150, and may output the output image PI disposed in the three-dimensional space region.

In this case, the output unit 180 outputs the output image PI loaded onto the first memory unit 150, that is, a low resolution image, to the three-dimensional space region. Accordingly, a user can check the photographing image I in each photographing direction and a direction or region from which the photographing image I has been omitted, by checking the output image PI that is photographed in each corresponding direction in the three-dimensional space region.

The communication unit 190 may transmit, to the management server 200, a panoramic image that is generated and stored by the panoramic image generation apparatus 100. The management server 200 may receive the original that is photographed by the panoramic image generation apparatus 100, and may receive a panoramic image from another user.

In this case, the communication unit 190 may transmit a panoramic image to the management server 200 by transmitting and receiving signals according to an arbitrary radio standard or protocol, among multiple radio standards or protocols including arbitrary other radio protocols (not limited thereto) that are designated as 3G, 4G, 5G and higher, in addition to IEEE 802.11, IEEE 702.20, general packet radio service (GPRS), evolution data optimized (Ev-DO), evolved high speed packet access (HSPA+), evolved high speed downlink packet access (HSDPA+), evolved high speed uplink packet access (HSUPA+), global system for mobile communications (GSM), enhanced data rates for GSM evolution (EDGE), code division multiple access (CDMA), time division multiple access (TDMA), digital enhanced cordless telecommunications (DECT), long term evolution (LTE), Zigbee, near field communication (NFC), a radio frequency (RF), and Bluetooth.

The management server 200 may receive a panoramic image from at least one panoramic image generation apparatus 100 over a communication network, may store the panoramic image, and may provide the stored panoramic images to a user or another user.

In this case, the management server 200 may be at least one separate storage server that connected to the panoramic image generation apparatus.

FIG. 2 is a flowchart illustrating a panoramic image generation method that is performed by the panoramic image generation apparatus of FIG. 1. FIG. 3 is a flowchart illustrating an image stitching step of the panoramic image generation method of FIG. 2 in detail.

Referring to FIGS. 2 and 3, the panoramic image generation method using the panoramic image generation apparatus 100 may include a photographing image input step S100, a photographing information generation step S200, a path information generation step S300, an image conversion step S400, an image storage step S500, a photographing image output step S600, an image stitching execution step S700, and a panoramic image storage step S800.

First, the photographing image input step S100 of receiving a plurality of photographing image that has been photographed is performed.

In the photographing image input p S100, the panoramic image generation apparatus 100 may receive the plurality of photographing images I photographed based on nodes that are disposed at preset intervals in a three-dimensional space region.

Thereafter, the photographing information generation step S200 of generating the photographing information ($I_C$) of the photographing images I based on the photographing posture information ($I_{CP}$) including photographed camera posture information of the photographing images I is performed.

In the photographing information generation step S200, the photographing information ($I_C$) may be generated based on the photographing posture information ($I_{CP}$) including the photographed orientation information ($I_{CD}$) of the photographing images I.

In the photographing information generation step S200, the photographing information ($I_C$) may be generated in the form of a file name of the photographing image I, but is not limited thereto and the photographing information ($I_C$) may be generated based on metadata or a separate file.

Thereafter, the path information generation step S300 of generating the stitching path information R, that is, arrangement information of the photographing images I corresponding to the output images PI that are disposed in the three-dimensional space region, may be performed.

In the path information generation step S300, the stitching path information R may be generated based on the file name of the photographing image I.

In the path information generation step S300, the panoramic image generation apparatus 100 may generate the stitching path information R on which a separate configuration file on which a path has been recorded is generated, based on a file name corresponding to the directory or file path of the photographing images I that are stitching targets and that are photographed at the same location, but the present disclosure is not limited thereto. The stitching path information R may be generated based on any path indicative of the photographing image I, that is, a stitching target. Illustratively, the stitching path information R may be generated in a text file or extensible markup language (XML) file format, like an electronic file that is used to store, modify, or control the configurations of an operating system or a program.

Thereafter, the image conversion step S400 of generating the output image PI that is obtained by converting the photographing image I into a low resolution image is performed.

Thereafter, the image storage step S500 of storing, in the second memory unit, the photographing images I and the output images PI converted from the photographing images I is performed.

Thereafter, the photographing image output step S600 of outputting the output images PI converted from the photographing images I by disposing the output images PI in the three-dimensional space region based on the photographing information ($I_C$) of the photographing images I is performed.

In this case, in the photographing image output step S600, the output image PI stored in the second memory unit may be loaded onto the first memory unit 150, and the output image PI disposed in the three-dimensional space region may be output.

Thereafter, the image stitching execution step S700 of generating a panoramic image by sequentially performing stitching on the plurality of photographing images I corresponding to the output images PI disposed in the three-dimensional space region is performed.

In the image stitching execution step S700, the panoramic image P may be generated by removing the output image PI loaded onto the first memory unit 150 from the first memory unit 150, loading the photographing image I corresponding to the output image PI onto the first memory unit 150, and performing stitching between the photographing images I loaded onto the first memory unit 150.

In the image stitching execution step S700, stitching between the photographing images I may be performed so that a photographing image I having orientation information ($I_{CD}$) adjacent to preset orientation information, that is, a reference by which the photographing images I included in the panoramic image P are preferentially output, is disposed at the center of the panoramic image P.

In the image stitching execution step S700, the stitching between the photographing images I may be performed by disposing the photographing images I in the three-dimensional space region based on the stitching path information R.

In the image stitching execution step S700, the stitching may be performed by blending an overlap region, that is, a region that overlaps between the photographing images I disposed in the three-dimensional space region. The blending of the overlap region may be performed by measuring a plane distance between the photographing images of the overlap region, which is measured by performing raycasting from an origin point of the three-dimensional space region, and adjusting the gradient of the overlap region of the photographing images based on the measured plane distance.

Referring to FIG. 3, the image stitching execution step S700 may include an initial stitching execution step S710, an N-th stitching execution step S720, a stitching completion determination step S730, and a panoramic image generation step S740.

First, the initial stitching execution step S710 of generating a first stitching image by performing stitching between arbitrary photographing images that neighbor each other may be performed.

Thereafter, the N-th stitching execution step S720 of generating an N-th stitching image by performing stitching between an (N–1)-th (N is an integer equal to or greater than 2) stitching image ($SI_{N-1}$) and a photographing image that neighbors the (N–1)-th stitching image is performed. In this case, in the N-th stitching execution step S720, an N-th stitching image ($SI_N$) may be generated by loading the generated (N–1)-th stitching image ($SI_{N-1}$) and the photographing image that neighbors the (N–1)-th stitching image from the second memory unit 160 to the first memory unit 150 and performing stitching between the (N–1)-th stitching image ($SI_{N-1}$) and the photographing image that neighbors the (N–1)-th stitching image through a single process.

In the N-th stitching execution step S720, the generated (N–1)-th stitching image ($SI_{N-1}$) and the photographing image that neighbors the (N–1)-th stitching image on which the stitching has been completed may be removed from the first memory unit 150.

Thereafter, the stitching completion determination step S730 of determining whether the stitching of the photographing images has been completed by repeatedly performing the N-th stitching execution step may be performed.

In this case, in the stitching completion determination step S730, the panoramic image generation apparatus 100 may determine whether all of the photographing images I photographed at the same photographing location have been stitched. If the stitching between the photographing images has been completed, the panoramic image generation step S740 of generating the panoramic image may be performed based on the N-th stitching image ($SI_N$). If the stitching between the photographing images has not been completed, stitching between a generated stitching image and a photographing image that neighbors the stitching image may be repeatedly performed.

The panoramic image generation step S740 of generating the panoramic image based on the N-th stitching image ($SI_N$) on which the stitching has been finally completed is performed.

In the panoramic image generation step S740, the panoramic image P may be generated by projecting the N-th stitching image ($SI_N$) on which the stitching has been finally completed onto a two-dimensional plane and converting the N-th stitching image. In this case, the panoramic image may be generated to have a height that is half the width thereof.

In the panoramic image generation step S740, the panoramic image P that has high resolution and that has been converted based on the N-th stitching image ($SI_N$) on which stitching has been finally completed, by stitching several sheets of photographing images during a stitching execution step process, may be converted into the panoramic image P having low resolution by performing downscaling or resizing on the panoramic image P having high resolution.

Thereafter, the panoramic image storage step S800 of storing the panoramic image generated by the panoramic image generation apparatus 100 is performed.

In this case, in the panoramic image storage step S800, the generated panoramic image P may be stored and managed by transmitting the panoramic image to the management server 200 through the panoramic image generation apparatus 100 or the communication unit of the panoramic image generation apparatus 100.

Furthermore, in the panoramic image storage step S800, in order to generate the panoramic image P, the photographing image I or the stitching image SI loaded onto the first memory unit 150 may be deleted. Optionally, data of the first storage module 161 of the second memory unit 160 relating to the photographing image I and the output image PI that have been temporarily stored for stitching and output may be deleted.

FIG. 4 is an exemplary diagram illustrating that output images are disposed in a three-dimensional space region and output by the panoramic image generation apparatus of FIG. 1.

Referring to FIG. 4, a user may photograph a photographing image for generating a panoramic image by using the panoramic image generation apparatus 100.

In this case, nodes ($C_1$ and $C_3$) that are disposed at preset intervals in a three-dimensional space region are output to the panoramic image generation apparatus 100, and the user photographs the photographing image by focusing the photographing image on the node ($C_1$). Accordingly, the photographing images I that are obtained by photographing photographing regions corresponding to the nodes ($C_1$ and $C_3$) may be generated and input.

The nodes ($C_1$ and $C_3$) generated in the three-dimensional space region may be first photographed by the user, and may be the nodes ($C_1$ and $C_3$) that are generated on the basis of the photographing posture information ($I_{CP}$), that is, camera posture information included in the photographing information ($I_C$) of photographed images have that been first photographed, but may be the nodes ($C_1$ and $C_3$) that are disposed at preset intervals in the three-dimensional space region and may be displayed along with a next location that needs to be photographed or the number of photographing images that need to be photographed along with the nodes ($C_1$ and $C_3$).

In this case, the preset interval may be a predetermined interval that is set based on the number of photographing images I for generating a 360-degree omnidirectional image, and can guide or support a location or direction in which the photographing image I needs to be photographed with respect to the user.

After photographing the photographing images, the panoramic image generation apparatus 100 may load output images ($PI_1$ and $PI_2$), that is, low resolution images of the photographing images I, onto the first memory unit 150 so that the output images ($PI_1$ and $PI_2$) are stored in the first storage module 161 of the second memory unit 160, that is, a temporary repository, and are output from the first storage module 161 based on the photographed photographing images I and the photographing information ($I_C$). The output unit 180 may output the output images ($PI_1$ and $PI_2$) loaded onto the first memory unit 150 by disposing the output images in the three-dimensional space region. The user may check the locations of the photographed photographing images I and whether the photographing images have been properly photographed.

FIG. 5 is an exemplary diagram illustrating that photographing images are sequentially stitched by the image stitching step of the panoramic image generation method of FIG. 2.

Referring to FIG. 5, first, in step (A), the initial stitching execution step of generating the first stitching image ($SI_1$) on which stitching between arbitrary photographing images ($I_1$ and $I_2$) that neighbor each other has been completed by performing the stitching between the photographing images ($I_1$ and $I_2$) may be performed.

When the initial stitching execution step is performed, the panoramic image generation apparatus 100 may remove the output image PI loaded onto the first memory unit 150 in order to be output through the output unit 180, and may load the photographing images ($I_1$ and $I_2$) that will be initially stitched from the second memory unit 160 to the first memory unit 150.

In this case, regarding the photographing images ($I_1$ and $I_2$) on which the initial stitching is performed, an arbitrary one of a plurality of photographing images may be first selected, the selected photographing image and a photographing image that neighbors the selected photographing image may be loaded onto the first memory unit 150, and stitching may be performed on the selected photographing image and the photographing image. However, a photographing image having the orientation information ($I_{CD}$) adjacent to the preset orientation information may be disposed in a three-dimensional space region so that the photographing image is disposed at the center of the panoramic image P. Stitching with a neighbor photographing image may be performed on the basis of the photographing image having the orientation information ($I_{CD}$) adjacent to the preset orientation information.

The occurrence of a memory load, which occurs during stitching, can be prevented by deleting data including the output image PI previously loaded onto the first memory unit 150 and loading only the photographing images ($I_1$ and $I_2$), that is, targets to be initially stitched, onto the first memory unit 150.

When the first stitching image ($SI_1$) is generated in step (A), the plurality of photographing images ($I_1$ and $I_2$)

stitched in order to generate the first stitching image ($SI_1$) may be removed from the first memory unit 150.

Thereafter, in step (B), a second stitching execution step of generating the second stitching image ($SI_2$) by performing stitching between the first stitching image ($SI_1$), which has been generated by performing the initial stitching step in step (A), and the photographing image ($I_3$) that neighbors the first stitching image ($SI_1$) is performed.

In this case, the second stitching image ($SI_2$) may be generated by loading the generated first stitching image ($SI_1$) and the photographing image that neighbors the first stitching image ($SI_1$) from the second memory unit 160 to the first memory unit 150 and performing stitching between the first stitching image ($SI_1$) and the photographing image ($I_3$) that neighbors the first stitching image through a single process.

When the second stitching image ($SI_2$) is generated, the first stitching image ($SI_1$) generated by performing the initial stitching (first step and stitching) the photographing image that neighbors the first stitching image may be removed from the first memory unit 150, and step (C), that is, a next third stitching execution step, may be performed.

As in step (B), in step (C), the third stitching image ($SI_3$) may be generated by loading the second stitching image ($SI_2$) generated in the previous stitching execution step and the photographing image ($I_3$) that neighbors the second stitching image from the second memory unit 160 to the first memory unit 150. When the third stitching image is generated, the second stitching image ($SI_2$) and the photographing image ($I_4$) that neighbors the second stitching image, on which the stitching has been performed, may be removed from the first memory unit 150, and a next stitching execution step may be performed.

Conclusionally, the panoramic image generation apparatus 100 repeatedly performs the stitching execution step. If a photographing image that is a stitching target and that is photographed at the same location is no longer present, the panoramic image generation apparatus may generate the panoramic image P based on the stitching image (SI) generated by performing final stitching, and may store the panoramic image P in the second storage module 162 of the second memory unit 160.

In this case, the panoramic image P having a height that is half the width thereof may be generated by projecting a final stitching image, which is finally generated by performing the panoramic image generation step, onto a two-dimensional image plane and converting the final stitching image.

Furthermore, the image conversion unit 140 of the panoramic image generation apparatus 100 performs downscaling or resizing on the panoramic image P, that is, a high resolution image in which several sheets of photographing images have been stitched through the stitching execution step. Accordingly, a data load can be reduced when the panoramic image is stored or loaded onto the management server 200 and the panoramic image generation apparatus 100.

FIG. 6 is an exemplary diagram illustrating a panoramic image that is generated based on a plurality of photographing images by the panoramic image generation apparatus of FIG. 1.

Referring to FIG. 6, the panoramic image generation apparatus 100 may generate the panoramic image P that has been stitched based on four photographing images obtained by photographing some regions at the same location.

Specifically, the panoramic image generation apparatus 100 may generate the panoramic image P by stitching the four photographing images I and projecting the stitched stitching image (SI) onto a two-dimensional plane having a ratio in which the height of the two-dimensional plane is half the width thereof and converting the stitched stitching image.

The panoramic image generation apparatus 100 may generate the panoramic image P, based on the stitching image (SI) that is generated by first performing stitching on the first photographing image ($I_1$) and the second photographing image ($I_2$), then stitching an image in which the first photographing image ($I_1$) and the second photographing image ($I_2$) have been stitching and the third photographing image ($I_3$), that is, a neighbor image, and then performing stitching between an image in which the first photographing image ($I_1$), the second photographing image ($I_2$), and the third photographing image ($I_3$) have been stitched and a neighbor fourth photographing image ($I_4$).

In this case, the panoramic image generation apparatus 100 may perform the blending of overlap regions ($BI_1$, $BI_2$, and $BI_3$), that is, regions that overlap between the photographing images ($I_1$, $I_2$, $I_3$, and $I_4$) disposed in the three-dimensional space region.

Specifically, the panoramic image generation apparatus 100 may determine the overlap regions ($BI_1$, $BI_2$, and $BI_3$) by performing raycasting from an origin point of the three-dimensional space region in which the stitching image (SI) or the photographing image I is disposed.

In this case, the panoramic image generation apparatus may perform the blending of the overlap regions ($BI_1$, $BI_2$, and $BI_3$) that are generated between the photographing images ($I_1$, $I_2$, $I_3$, and $I_4$), by measuring plane distances between the photographing images ($I_1$, $I_2$, $I_3$, and $I_4$) based on a virtual line that is generated from the origin point by performing raycasting and adjusting the gradients of the overlap regions ($BI_1$, $BI_2$, and $BI_3$) of the photographing images ($I_1$, $I_2$, $I_3$, and $I_4$) based on the measured plane distances.

The panoramic image generation apparatus 100 can reduce an edge phenomenon that occurs in the blending process, by correcting the gradients of pixels of the redundant overlap regions ($BI_1$, $BI_2$, and $BI_3$) of the photographing images ($I_1$, $I_2$, $I_3$, and $I_4$), which intersect the virtual line that is generated by performing raycasting, based on the plane distances between the photographing images ($I_1$, $I_2$, $I_3$, and $I_4$) disposed in the three-dimensional space region.

In this case, the panoramic image generation apparatus 100 may set a higher gradient, that is, a higher weight, in the pixels of an overlap region ($BI_1$, $BI_2$, $BI_3$) corresponding to a photographing image close to the origin point of the three-dimensional space region than in the pixels of an overlap regions ($BI_1$, $BI_2$, $BI_3$) corresponding to another photographing image that intersects the same virtual line.

In this case, the origin point may be a camera photographing origin point in a photographed three-dimensional space region including the photographing images ($I_1$, $I_2$, $I_3$, and $I_4$).

Furthermore, the panoramic image generation apparatus 100 may measure a plane distance between the intersection points of photographing images that intersect the virtual line that is generated by performing raycasting on the basis of the origin point, and may adjust the gradient of pixels of the intersection point of a photographing image, which is close to the origin point, to be great and the gradient of pixels of the intersection point of a photographing image, which is far from the origin point, to be small as the plane distance between the photographing images becomes greater.

The present disclosure is not limited thereto. The panoramic image generation apparatus 100 may perform stitching by blending overlap regions by using various blending algorithm methods, such as blending using feature points, SURF, and multi-band blending.

According to the present embodiment, the panoramic image generation apparatus 100 can dynamically perform memory management in a process of a plurality of output images PI being output and a process of stitching the photographing image I, that is, an original image of the output image PI that is disposed, by disposing the plurality of output images PI in a three-dimensional space region.

In the aforementioned embodiments, the components and characteristics of the present disclosure have been combined in a specific form. Each of the components or characteristics may be considered to be optional unless otherwise described explicitly. Each of the components or characteristics may be implemented in a form to be not combined with other components or characteristics. Furthermore, some of the components or the characteristics may be combined to form an embodiment of the present disclosure. The sequence of the operations described in the embodiments of the present disclosure may be changed. Some of the components or characteristics of an embodiment may be included in another embodiment or may be replaced with corresponding components or characteristics of another embodiment. It is evident that an embodiment may be constructed by combining claims not having an explicit citation relation in the claims or may be included as a new claim by amendments after filing an application.

The embodiment according to the present disclosure may be implemented by various means, for example, hardware, firmware, software or a combination of them. In the case of an implementation by hardware, the embodiment of the present disclosure may be implemented using one or more application-specific integrated (ASICs), circuits digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be embodied in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

Furthermore, although the preferred embodiments of the present disclosure have been described above, the present disclosure is not limited to the embodiments, but may be modified and embodied in various ways within the scope of the claims, the detailed description of the present disclosure, and the accompanying drawings, which may also belong to the claims.

MODE FOR DISCLOSURE

A form for implementing the disclosure has also been described in the best mode for implementing the disclosure.

INDUSTRIAL APPLICABILITY

The present disclosure relates to the panoramic image generation apparatus and method, and has repeatability and industrial applicability in a panoramic image generation apparatus for generating a panoramic image, etc.

The invention claimed is:

1. A panoramic image generation apparatus for generating a panoramic image based on a plurality of images, the panoramic image generation apparatus comprising:

a photographing unit configured to receive a plurality of photographing images;

a photographing information generation unit configured to generate photographing information of the photographing images based on photographing posture information comprising photographed camera posture information of the photographing images;

an image conversion unit configured to generate output images that are obtained by converting the photographing images into low resolution images;

an output unit configured to output the output images converted from the photographing images by disposing the output images in a three-dimensional space region based on the photographing information of the photographing images;

an image stitching unit configured to generate a panoramic image by sequentially performing stitching on the plurality of photographing images corresponding to the output images disposed in the three-dimensional space region;

a first memory unit provided so that the output images output to the output unit and the photographing images for the execution of the image stitching by the image stitching unit are loaded thereon; and a second memory unit configured to store the photographing images and the output images converted from the photographing images, wherein the image stitching unit performs the stitching by blending overlap regions that are regions that overlap between the photographing images disposed in the three-dimensional space region, and performs the blending between the photographing images by measuring a plane distance between the photographing images of the overlap region, which is measured by performing raycasting from an origin point of the three-dimensional space region, and adjusting a gradient of the overlap region of the photographing images based on the measured plane distance.

2. The panoramic image generation apparatus of claim 1, wherein: the output unit outputs the output image disposed in the three-dimensional space region by loading the output image stored in the second memory unit onto the first memory unit, and the image stitching unit generates the panoramic image by removing the output images loaded onto the first memory unit from the first memory unit, loading the photographing images corresponding to the output images onto the first memory unit, and performing the stitching between the photographing images loaded onto the first memory unit.

3. The panoramic image generation apparatus of claim 2, wherein the image stitching unit performs initial stitching that generates a first stitching image by performing stitching between arbitrary photographing images that neighbor each other, performs N-th stitching that generates an N-th stitching image by performing stitching between an (N−1)-th (N is an integer equal to or greater than 2) stitching image and a photographing image that neighbors the (N−1)-th stitching image, and generates the panoramic image based on the N-th stitching image by repeating the N-th stitching.

4. The panoramic image generation apparatus of claim 3, wherein the image stitching unit generates the N-th stitching image by loading the generated (N−1)-th stitching image and the photographing image that neighbors the (N−1)-th stitching image from the second memory unit to the first memory unit and performing the stitching between the (N−1)-th stitching image and the photographing image that neighbors the (N−1)-th stitching image through a single process.

5. The panoramic image generation apparatus of claim 4, wherein when performing the N-th stitching, the image stitching unit removes the generated (N−1)-th stitching image and the photographing image that neighbors the (N−1)-th stitching image on which the stitching has been completed, from the first memory unit.

6. The panoramic image generation apparatus of claim 3, wherein: the photographing information generation unit generates the photographing information based on the photographing posture information comprising photographed orientation information of the photographing image, and the image stitching unit performs the stitching between the photographing images so that a photographing image having the orientation information adjacent to preset orientation information that is a reference by which the photographing images included in the panoramic image are preferentially output is disposed at a center of the panoramic image.

7. The panoramic image generation apparatus of claim 1, further comprising a path information generation unit configured to generate stitching path information that is arrangement information of the photographing images corresponding to the output images disposed in the three-dimensional space region, wherein the photographing information generation unit generates the photographing information in a form of a file name of the photographing image, the path information generation unit generates the stitching path information based on the file name of the photographing image, and the image stitching unit performs the stitching between the photographing images by disposing the photographing images in the three-dimensional space region based on the stitching path information.

8. The panoramic image generation apparatus of claim 1, wherein the photographing unit receives the plurality of photographing images photographed based on nodes that are disposed at preset intervals in the three-dimensional space region.

9. A panoramic image generation method using a panoramic image generation apparatus, comprising:

a photographing image input step of receiving a plurality of photographing images;

a photographing information generation step of generating photographing information of the photographing images based on photographing posture information comprising photographed camera posture information of the photographing images;

an image conversion step of generating output images that are obtained by converting the photographing images into low resolution images;

an image storage step of storing the photographing images and the output images converted from the photographing images in a second memory unit;

a photographing image output step of outputting the output images converted from the photographing images by disposing the output images in a three-dimensional space region based on the photographing information of the photographing images; and an image stitching execution step of generating a panoramic image by sequentially performing stitching on the plurality of photographing images corresponding to the output images disposed in the three-dimensional space region, wherein the photographing image output step comprises outputting the output images disposed in the three-dimensional space region by loading the output images stored in the second memory unit onto a first memory unit, and the image stitching execution step comprises loading the photographing images onto the first memory unit for the image stitching and performing the stitching between the photographing images loaded onto the first memory unit, and wherein in the image stitching execution step, the stitching is performed by blending overlap regions that are regions that overlap between the photographing images disposed in the three-dimensional space region, and the blending between the photographing images is performed by measuring a plane distance between the photographing images of the overlap region, which is measured by performing raycasting from an origin point of the three-dimensional space region, and adjusting a gradient of the overlap region of the photographing images based on the measured plane distance.

10. The panoramic image generation method of claim 9, wherein in the image stitching execution step, the panoramic image is generated by removing the output images loaded onto the first memory unit from the first memory unit, loading the photographing images corresponding to the output images onto the first memory unit, and performing the stitching between the photographing images loaded onto the first memory unit.

11. The panoramic image generation method of claim 10, wherein the image stitching execution step comprises:

an initial stitching execution step of generating a first stitching image by performing stitching between arbitrary photographing images that neighbor each other; and an N-th stitching execution step of generating an N-th stitching image by performing stitching between an (N−1)-th (N is an integer equal to or greater than 2) stitching image and a photographing image that neighbors the (N−1)-th stitching image, wherein the panoramic image is generated based on the N-th stitching image by repeatedly performing the N-th stitching execution step.

12. The panoramic image generation method of claim 11, wherein in the N-th stitching execution step, the N-th stitching image is generated by loading the generated (N−1)-th stitching image and the photographing image that neighbors the (N−1)-th stitching image from the second memory unit to the first memory unit and performing the stitching between the (N−1)-th stitching image and the photographing image that neighbors the (N−1)-th stitching image through a single process.

13. The panoramic image generation method of claim 12, wherein in the N-th stitching execution step, the generated (N−1)-th stitching image and the photographing image that neighbors the (N−1)-th stitching image on which the stitching has been completed are removed from the first memory unit.

14. The panoramic image generation method of claim 11, wherein:

in the photographing information generation step, the photographing information is generated based on the photographing posture information comprising photographed orientation information of the photographing image, and in the image stitching execution step, the stitching between the photographing images is performed so that a photographing image having the orientation information adjacent to preset orientation information that is a reference by which the photographing images included in the panoramic image are preferentially output is disposed at a center of the panoramic image.

15. The panoramic image generation method of claim 9, further comprising a path information generation step of generating stitching path information that is arrangement information of the photographing images corresponding to the output images disposed in the three-dimensional space region, wherein in the photographing information generation step, the photographing information is generated in a form of a file name of the photographing image, in the path information generation step, the stitching path information is generated based on the file name of the photographing image, and in the image stitching execution step, the stitching between the photographing images is performed by disposing the photographing images in the three-dimensional space region based on the stitching path information.

16. The panoramic image generation method of claim 9, wherein in the photographing image input step, the plurality of photographing images photographed based on nodes that are disposed at preset intervals in the three-dimensional space region is received.

* * * * *